United States Patent [19]
Saito et al.

[11] Patent Number: 5,362,387
[45] Date of Patent: Nov. 8, 1994

[54] BEER FILTERING DEVICE

[75] Inventors: Koji Saito, Kamakura; Tetsuhisa Makino, Tokoname, both of Japan

[73] Assignees: Sapporo Breweries Ltd., Tokyo; Makino Corporation, Tokoname, both of Japan

[21] Appl. No.: 130,431

[22] Filed: Oct. 1, 1993

Related U.S. Application Data

[63] Continuation of Ser. No. 873,752, Apr. 27, 1992, abandoned.

[51] Int. Cl.$^5$ .............................................. B01D 25/32
[52] U.S. Cl. ..................... 210/225; 210/228; 210/231
[58] Field of Search ............... 210/225, 228, 230, 231, 210/248, 409, 450, 797; 100/198

[56] References Cited

U.S. PATENT DOCUMENTS

| | | | |
|---|---|---|---|
| 1,194,949 | 8/1916 | Burchenal | 210/231 |
| 2,383,868 | 8/1945 | Kraus | 210/228 |
| 3,015,395 | 1/1962 | Stram et al. | 210/225 |
| 4,608,164 | 8/1986 | Neu | 210/231 |
| 4,891,117 | 1/1990 | Gardner, Sr. | 210/231 |

FOREIGN PATENT DOCUMENTS

| | | | |
|---|---|---|---|
| 25314 | 3/1981 | European Pat. Off. | 210/225 |
| 2-253805 | 12/1990 | Japan | |

*Primary Examiner*—Matthew O. Savage
*Attorney, Agent, or Firm*—Ronald R. Snider

[57] ABSTRACT

A beer filtering device of a filter press type for filtering a beer stock. The beer filter device includes a plurality of filter plates (4) and a plurality of filter frames (6) arranged side by side in alternate relationship to each other. A filter element (28) is supported to each filter plate (4). A stock line (66) for supplying a beer stock and a filtrate line (68) for discharging a filtrate of the beer stock are so formed as to penetrate through the filter plates and the filter frames in the thickness direction thereof. The stock line and the filtrate line are sealed by a plurality of stock line seals (48) and a plurality of filtrate line seals (74), respectively, each interposed between the filter plate and the filter frame adjacent to each other in a filtering step. A plurality of washer liquid seals (76) are provided outside the stock line seals and the filtrate line seals in such a manner that each washer liquid seal is interposed between the filter plate and the filter frame adjacent to each other. In a washing step, a space defined by the filter plates and the filter frames is sealed by the washer liquid seals under the condition where the sealed condition of the stock line and the filtrate line by the stock line seals and the filtrate line seals is released. In this condition, a washer liquid is circulated in the sealed space defined by the washer liquid seals to thereby extensively wash and sterilize the interior of the beer filtering device.

3 Claims, 5 Drawing Sheets

BEER FILTERING DEVICE

This application is a continuation, of application Ser. No. 07/873,752, filed Apr. 27, 1993 now abandoned.

BACKGROUND OF THE INVENTION

The present invention relates to a beer filtering device to be used in production of beer, and more particularly to a beer filtering device having a structure of a multi-stage filter press type, which is characterized in a washing and sterilizing function before or after a filtering step.

In general, the production of beer is roughly classified into the steps of (1) making malt from barley; (2) making wort from the malt; (3) fermenting the wort with yeast and ripening the wort to make a beer stock; and (4) filtering the beer stock to obtain the beer.

The filtering step is carried out by passing the ripened beer stock through a filtering device to thereby remove the yeast, bacteria, protein, etc. and obtain a transparent amber beer. If the yeast or the bacteria resides in the beer, a yeast odor is left in the beer, or the beer becomes cloudy and unstable. Particularly in case of producing a draft beer which is not subject to heat treatment, the bacteria or the like must be sufficiently removed by filtration. Thus, the filtering step as the final step of the production of beer is important, and such filtration is called precision filtration since it is performed by using a very fine filter element with a high precision.

It is known that various types of filtering devices are employed for the filtration of beer. For example, a filtering device of a multi-stage filter press type is employed for the filtration of beer. In such a filtering device, a plurality of filter elements are arranged side by side with a plurality of filter plates and filter frames, and the whole is pressed. The beer stock is supplied to the filter elements in parallel to be filtered, and the filtrate of the beer stock is recovered from each filter element in parallel.

More specifically, the filter elements are respectively supported to the filter plates, and a filter chamber is defined in each filter frame so as to face each filter element. The filter plates and the filter frames are arranged side by side in alternate relationship to each other to form an array. In filtering the beer stock, a pressure is applied from press means to the array of the filter plates and the filter frames sandwiched relative to each other.

A stock line for supplying the beer stock to the filter elements and a filtrate line for recovering the filtrate are independently formed through the array of the filter plates and the filter frames. The stock line is constituted of a plurality of stock line holes penetrating through the filter plates and the filter frames, and the filtrate line is constituted of a plurality of filtrate line holes penetrating through the filter plates and the filter frames. The adjacent ones of the stock line holes are adapted to be sealedly communicated with each other through a stock line seal, and the adjacent ones of the filtrate line holes are adapted to be sealedly communicated with each other through a filtrate line seal.

In the filtering step, when the pressure is applied from the press means to the array of the filter plates and the filter frames, the stock line seals and the filtrate line seals are brought into a sealing condition to thereby liquid-tightly seal the stock line and the filtrate line and define a filter chamber between the opposed filter plates through the filter frame. In this condition, the beer stock is supplied from the stock line to each filter element, and the filtrate from each filter element is collected to the filtrate line. Further, in case of maintenance such as replacement of the filter elements, the pressure of the press means is removed to move the filter plates and the filter frames away from each other and thereby cancel the sealing condition of the stock line seals and the filtrate line seals.

Each of the stock line seals and the filtrate line seals is mounted on an outer peripheral portion or a central portion of each filter plate or each filter frame, and it is made of an elastic material such as rubber.

Meanwhile, it is very important to wash and sterilize the interior of the filtering device before or after the filtering step. If such a washing step is not performed, the filtrate is contaminated by bacteria residing in the interior of the filtering device, so that the filtration becomes insignificant.

The washing step is simply performed by forcing a sterilizing washer liquid into the filtering device instead of the beer stock. Accordingly, in the washing step, the washer liquid flows in a sealed passage for the beer stock and a sealed passage for the filtrate to thereby wash and sterilize these sealed passages.

However, the washer liquid cannot be circulated through a pressure-contact surface of the filter element between the filter plate and the filter frame adjacent to each other and in the peripheries of the stock line seals and the filtrate line seals. As a result, there is a possibility that bacteria residing in the peripheries of these seals enter the sealed passages to contaminate the filtrate in the filtering step.

SUMMARY OF THE INVENTION

It is accordingly an object of the present invention to sufficiently circulate the washer liquid not only in the sealed passages for the beer stock and the filtrate but also in the peripheries of the sealed passages, thereby washing and sterilizing the interior of the filter press as the filtering device extensively and reliably.

It is another object of the present invention to isolate the sealing portions of the stock line and the filtrate line, the stock line seals, and the filtrate line seals from the atmospheric air, thereby preventing that the bacteria will penetrate into the sealed passages.

It is a further object of the present invention to effect such extensive and reliable washing and sterilization with a simple construction and operation and no troublesomeness for preparation.

The essential feature of the present invention is that a plurality of washer liquid seals as second seal means addition to the stock line seals and the filtrate line seals as first seal means are provided in the beer filtering device. More specifically, each washer liquid seal is mounted on either the filter plate or the filter frame adjacent to each other so as to annularly surround the filter element, the stock line seal and the filtrate line seal. A spacing between the filter plate and the filter frame adjacent to each other is variably set by the press means. In the filtering step, the filter plate and the filter frame are approached to each other by increasing the pressure of the press means to reduce the spacing, thus setting a filtering position. In the washing step, the filter plate and the filter frame are moved away from each other by decreasing the pressure of the press means to increase the spacing, thus setting a washing position.

In the course of reduction in the spacing from the condition where no pressure is applied from the press means to the filter plates and the filter frames, the second seal means (the washer liquid seal) is first brought into contact with the filter plate or the filter frame adjacent to each other, thereby sealing the outer peripheries of the filter plate and the filter frame. Then, the first seal means (the stock line seal and the filtrate line seal) is brought into contact with the filter plate or the filter frame, thereby sealingly defining the stock line and the filtrate line. In the filtering position, both the first seal means and the second seal means are elastically deformed under compression and an amount of elastic compressive deformation of the second seal means is set to be larger than that of the first seal means.

On the other hand, in the course of increase in the spacing from the filtering position, the first seal means is first brought into separation from the filter plate or the filter frame, thereby releasing the sealed condition of the stock line and the filtrate line. At this time, the second seal means remains elastically deformed to maintain The sealed condition of the outer peripheries of the filter plate and the filter frame, thereby defining a sealed space inside the second seal means. In this washing position, a washer liquid is supplied into the sealed space to extensively wash and sterilize the periphery of the first seal means as well as the passages for the beer stock and the filtrate.

In a preferred mode of the present invention, The second seal means also serves as a kind of spring means. That is in shifting from the filtering step to the washing step, the spacing between the filter plate and the filter frame adjacent to each other is expanded by an elastic return force of the second seal means to restore an original form of the first seal means and release the sealed condition of the stock line and the filtrate line. In this manner, the second seal means serves as both the spring means and the seal means.

Other objects and features of the invention will be more fully understood from the following detailed description and appended claims when taken with the accompanying drawings.

DETAILED DESCRIPTION OF THE PREFERRED EMBODIMENTS

Figure 1:
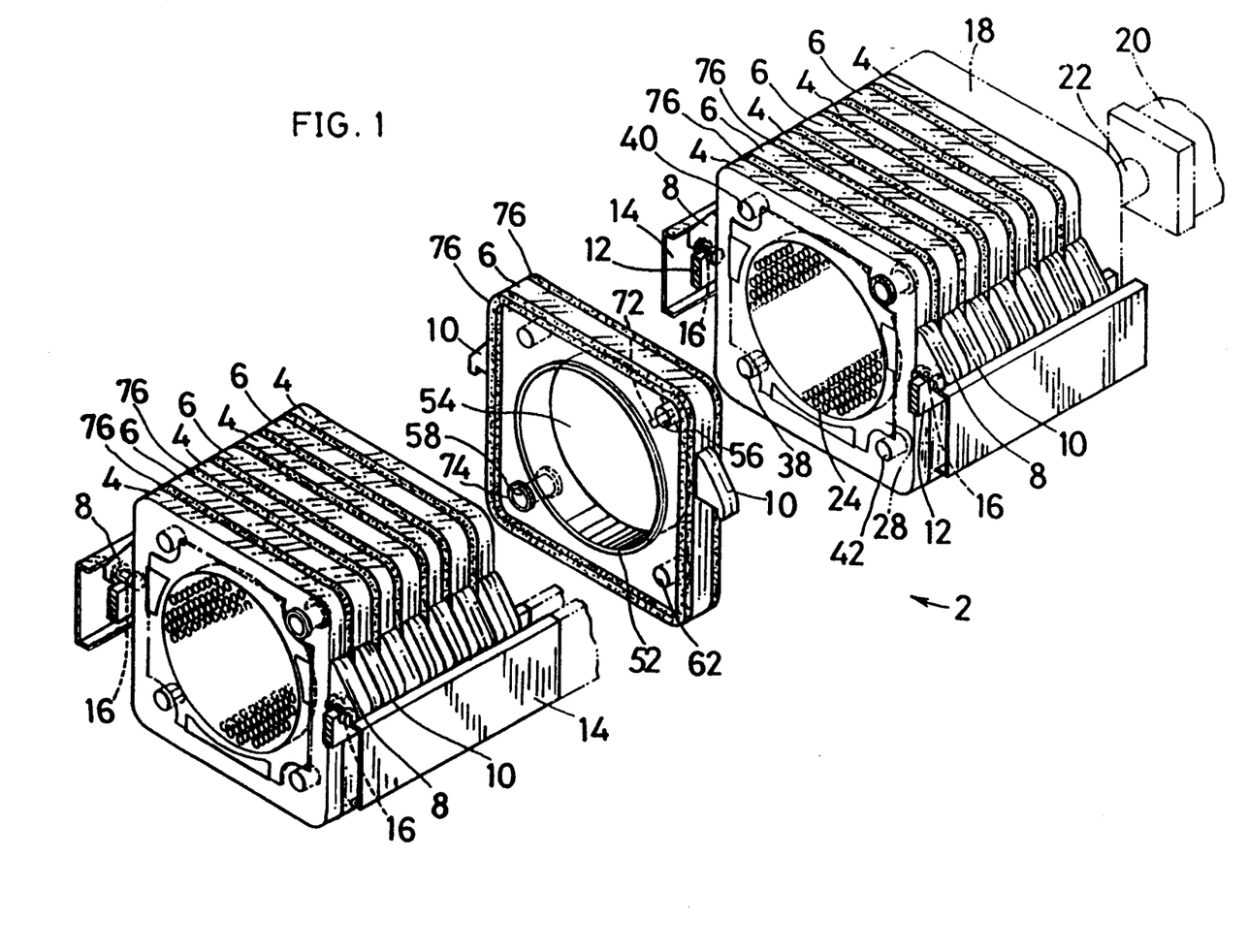
FIG. 1 is an exploded perspective view of the beer filtering device according to a preferred embodiment of the present invention.

There is shown in FIG. 1 an essential part of a filter press type beer filtering device 2 according to a preferred embodiment of the present invention. The beer filtering device 2 is provided with a plurality of filter plates 4 and filter frames 6 arranged side by side in alternate relationship to each other. Each of the filter plates 4 and the filter frames 6 is formed in a substantially square planar shape. A pair of guided portions 8 are formed on right and left sides of each filter plate 4, and a pair of guided portions 10 are similarly formed on right and left sides of each filter frame 6. A pair of guide rails 12 are provided to extend along an array of the filter plates 4 and the filter frames 6, so that the guided portions 8 and 10 of the filter plates 4 and the filter frames 6 are supported to the guide rails 12 so as to be movable in front and rear directions of the array (i.e., in a longitudinal direction of the guide rails 12). A plurality of guide rollers 16 are rotatably provided on each guide rail 12, and the guided portions 8 and 10 are movably put on the guide rollers 16, thereby reducing a frictional resistance during the movement of the filter plates 4 and the filter frames 6 in the longitudinal direction of the guide rails 12. A pair of cover plates 14 are provided outside the guide rails 12.

A hydraulic cylinder 20 as the press means is provided behind the rear end of the array of the filter plates 4 and the filter frames 6, and a pressure plate 18 is interposed between the hydraulic cylinder 20 and the array. A piston rod 22 of the hydraulic cylinder 20 is connected to the pressure plate 18, so that when the piston rod 22 is expanded, the filter plates 4 and the filter frames 6 are pressed by the pressure plate 18 in their thickness direction. The pressure plate 18 abuts the filter frame 4 as shown in FIG. 1.

Figure 2:
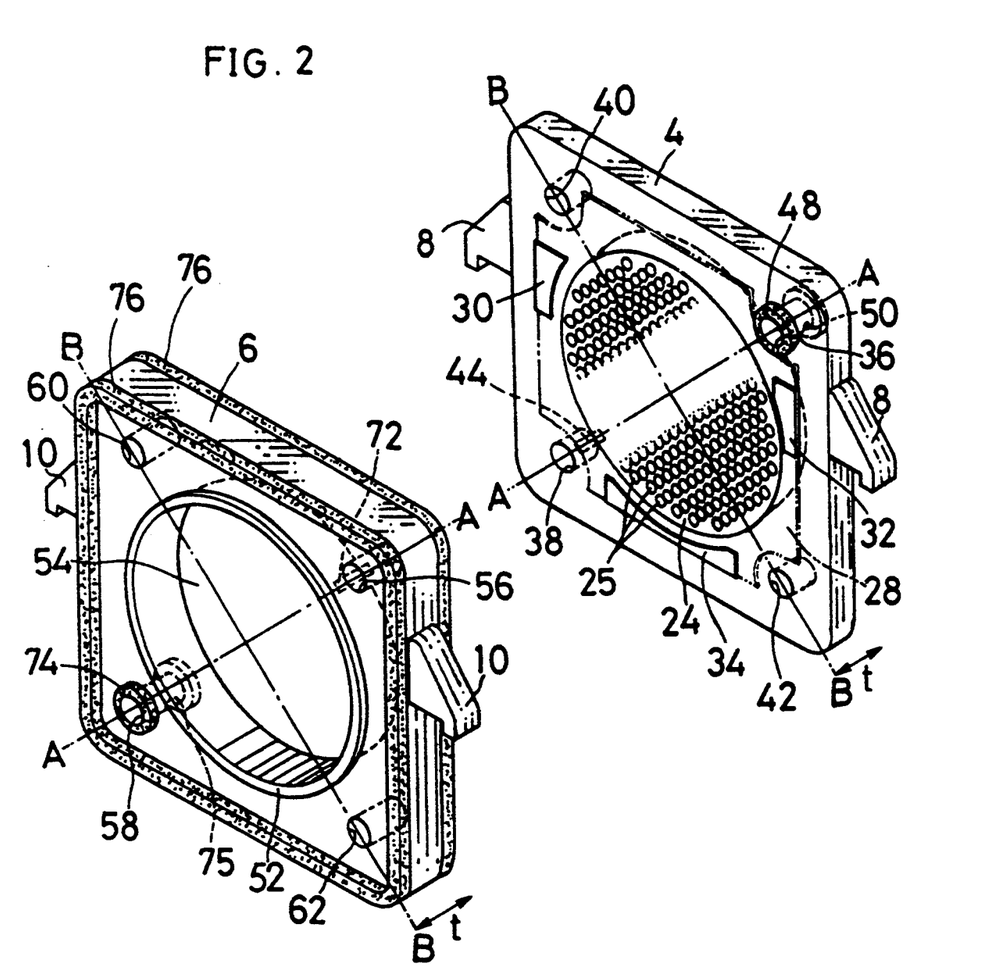
FIG. 2 is a perspective view of each one of the filter plates and the filter frames constituting the beer filtering device shown in FIG. 1.
Figure 4:
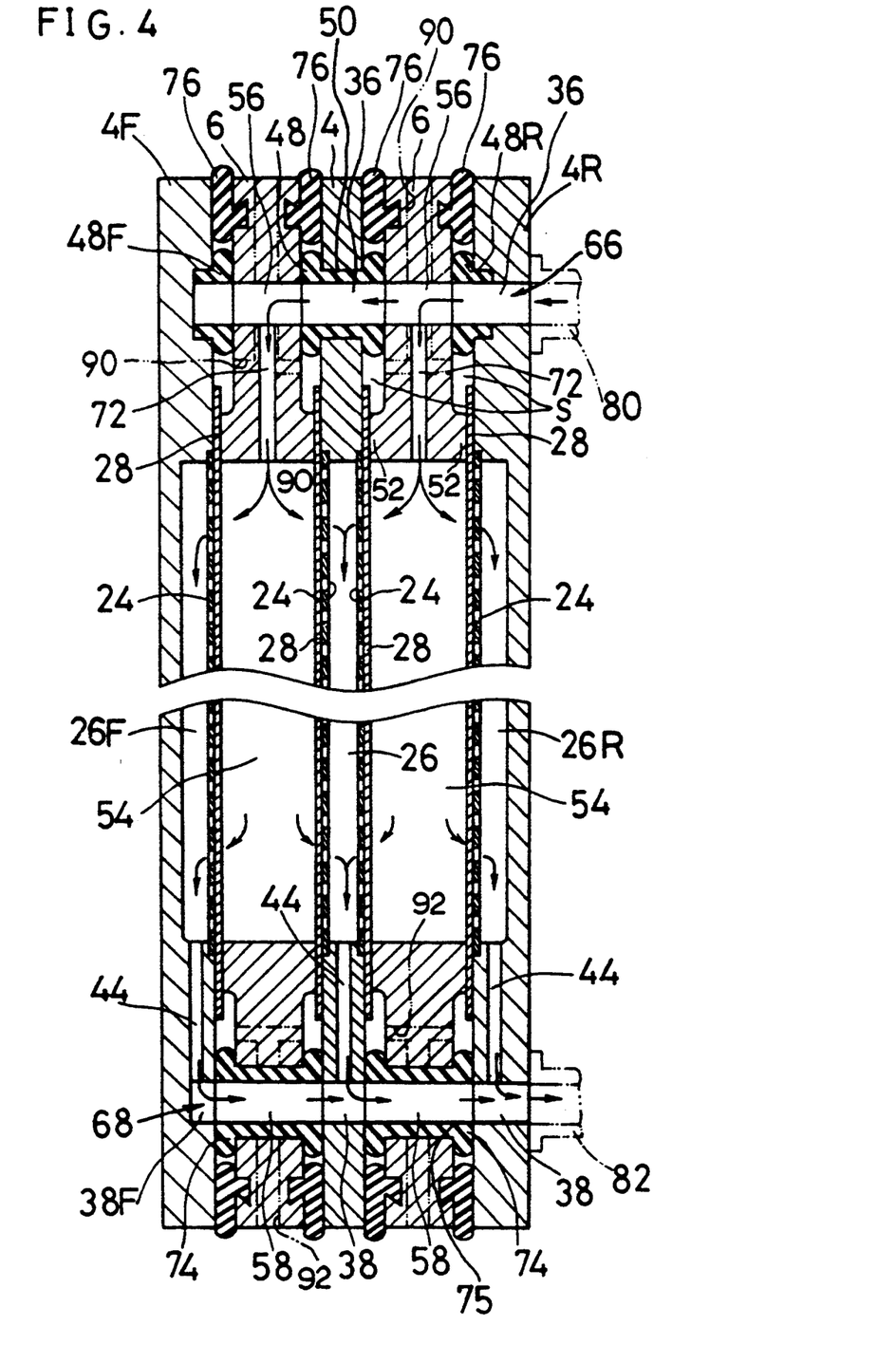
FIG. 4 is a sectional view of the beer filtering device in the filtering step as taken along the line A—A in FIG. 2 (the number of the filter plates and the filter frames being reduced for the convenience of illustration)

As apparent from FIGS. 2 and 4, each filter plate 4 is provided at its central portion with a pair of filter beds 24 opposed to each other. Each filter bed 24 is formed as a thin plate having a plurality of small apertures 25. Accordingly, there is defined a central space 26 between the opposed Filter beds 24 of each filter plate 4. Further, a pair of filter elements 28 are provided on the outer surfaces of the Filter beds 24 in such a manner as to be removably attached thereto. Each filter element 28 is formed as a sheet of paper, cloth, etc. As apparent from FIG. 2, a set of three filter element holders 30, 32 and 34 are formed on each outer surface of the filter plate 4 so as to surround the respective filter bed 24, and each filter element 28 is held by the three filter element holders 30, 32 and 34 in such a manner as to be inserted from the upper side of the filter plate 4.

A stock line hole 36 is formed at one of two upper corners of the filter plate 4, and a filtrate line hole 38 is formed at one of two lower corners of the filter plate 4 in diagonal relationship to the stock line hole 36. Both the stock line hole 36 and the filtrate line hole 38 penetrate through the filter plate 4 in the thickness direction thereof. Further, a washer liquid supply line hole 40 is formed at the other of the two upper corners of the filter plate 4, and a washer liquid discharge line hole 42 is formed at the other of the two lower corners of the filter plate 4 in diagonal relationship to the washer liquid supply line hole 40. Both the washer liquid supply line hole 40 and the washer liquid discharge line hole 42 penetrate through the filter plate 4 in the thickness direction thereof. As apparent from FIG. 4, the filtrate line hole 38 of each filter plate 4 is communicated with the central space 26 defined between the opposed filter beds 24 through a filtrate discharge passage 44 extending in the diagonal direction toward the stock line hole 36.

Figure 5:
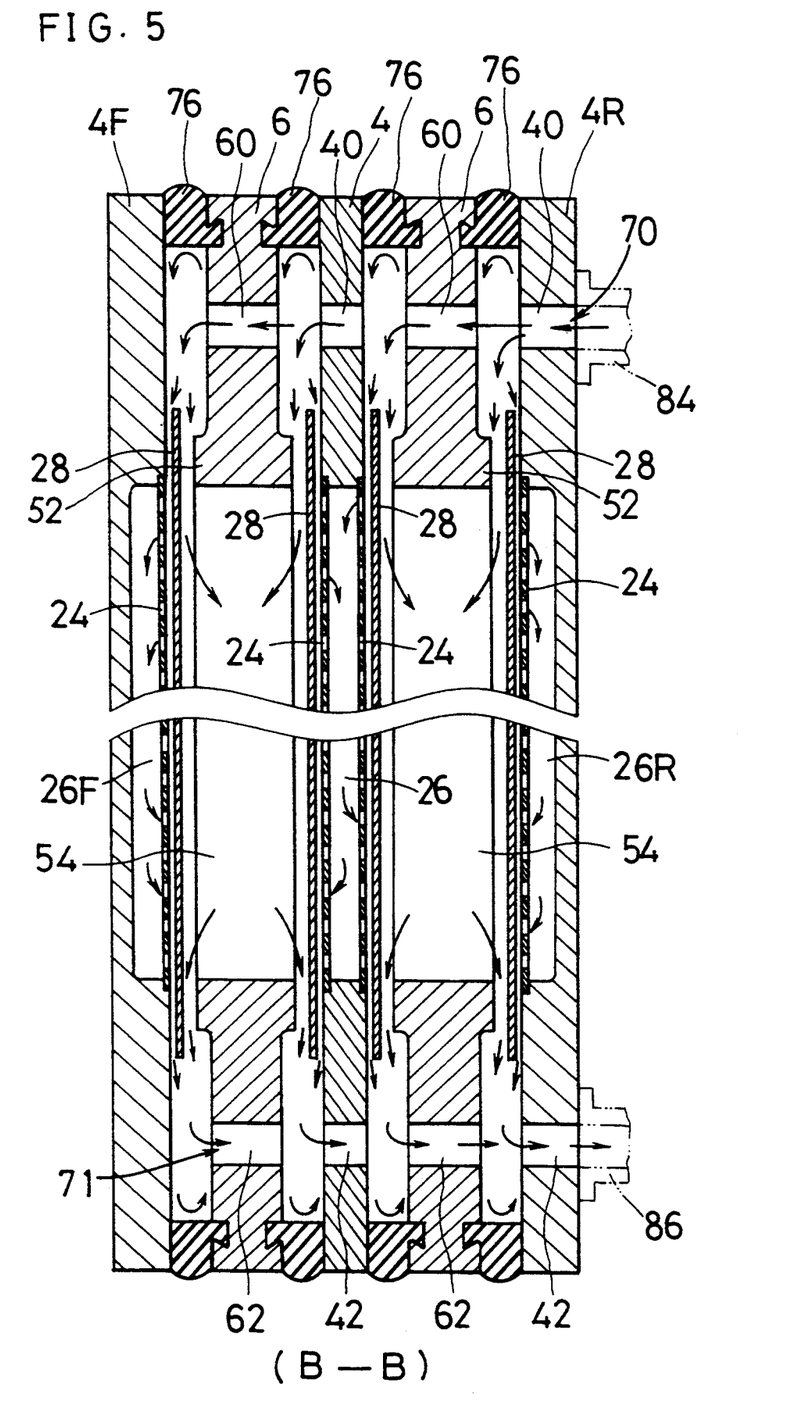
FIG. 5 is a view similar to FIG. 4, in the filtering step as taken along the line B—B in FIG. 2.
Figure 6:
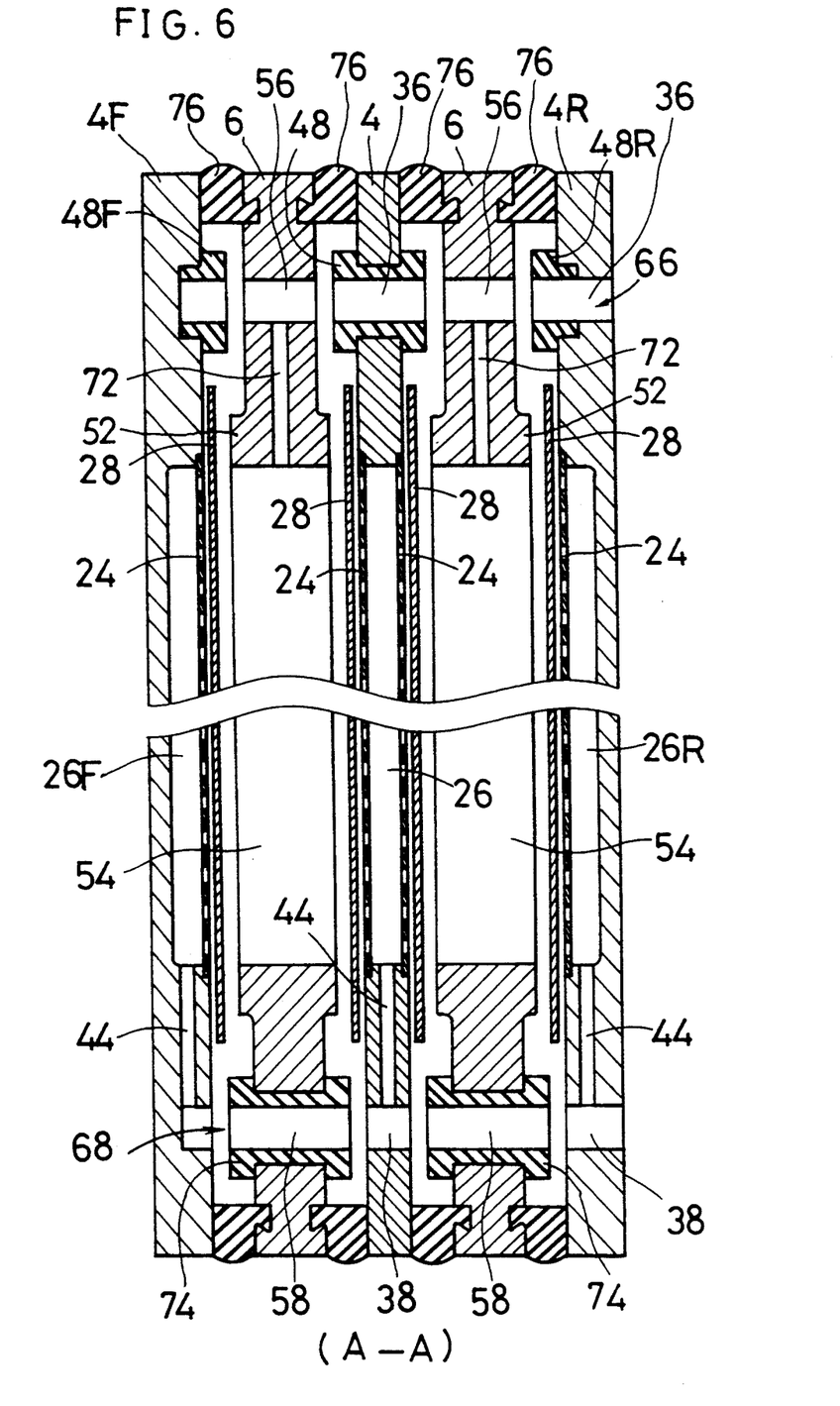
FIG. 6 is a view similar to FIG. 4, in the washing step as taken along the line A—A in FIG. 2.

For the simplicity of illustration, the number of the filter plates 4 and the filter frames 6 shown in FIGS. 4, 5 and 6 is minimized.

The stock line hole 36 of each filter plate 4 is defined in a stock line seal 48 mounted in a through hole 50 penetrating through the filter plate 4 in the thickness direction thereof. The stock line seal 48 is made of an elastic material such as rubber, and it has a substantially cylindrical shape with two flange portions at the opposite ends. As apparent from FIG. 4, the cylindrical portion of the stock line seal 48 is elastically inserted in the through hole 50, and the opposite flange portions of the stock line seal 48 project from the opposite side surfaces of the filter plate 4 so as to sealingly contact the side surfaces or stock hole seats of the adjacent filter frames 6.

Referring back to FIG. 2, each filter frame 6 is formed at its central portion with a circular through hole functioning as a filter chamber 54. The filter chamber 54 has a diameter substantially the same as that of each filter bed 24 of the filter plate 4, so that a beer stock fed into the filter chamber 54 can be uniformly applied to a filtering surface of each filter element 28 of the filter plate 4. Further, the opposite surfaces of the filter frame 6 are formed with annular low projections 52 so as to surround the circular hole forming the filter chamber 54, so that when the pressure of the hydraulic cylinder 20 is applied to the array, the filter elements 28 are pressed between the annular projections 52 of the filter frame 6 and the filter plate 4 to thereby define the filter chamber 54.

As similar to the construction of the filter plate 4, a stock line hole 56 is formed at one of two upper corners of the filter frame 6, and a filtrate line hole 58 is formed at one of two lower corners of the filter frame 6 in diagonal relationship to the stock line hole 56. Both the stock line hole 56 and the filtrate line hole 58 penetrate through the filter frame 6 in the thickness direction thereof. Further, a washer liquid supply line hole 60 is formed at the other of the two upper corners of the filter frame 6, and a washer liquid discharge line hole 62 is formed at the other of the two lower corners of the filter frame 6 in diagonal relationship to the washer liquid supply line hole 60. Both the washer liquid supply line hole 60 and the washer liquid discharge line hole 62 penetrate through the filter frame 6 in the thickness direction thereof. In the form of the array of the filter plates 4 and the filter frames 6 alternately arranged, the stock line holes 36 and 56 are aligned to each other to form a stock line 66, and the filtrate line holes 38 and 58 are aligned to each other to form a filtrate line 68 as shown in FIG. 4. Similarly, the washer liquid supply line holes 40 and 60 are aligned to each other to form a washer liquid supply line 70, and the washer liquid discharge line holes 42 and 62 are aligned to each other to form a washer liquid discharge line 71 as shown in FIG. 5.

As shown in FIGS. 2 and 4, the stock line hole 56 of each filter frame 6 is communicated with the filter chamber 54 through a stock introduction passage 72 extending in the diagonal direction toward the filtrate line hole 58.

The filtrate line hole 58 of the filter frame 6 is defined in a filtrate line seal 74. The filtrate line seal 74 is identical in structure and material with the stock line seal 48 of the filter plate 4. That is, the filtrate line seal 74 is integrally formed with a cylindrical portion and a pair of opposite flanked portions. The cylindrical portion is elastically inserted in a through hole 75 penetrating through the filter frame 6 in the thickness direction thereof, and the flanked portions project from the opposite side surfaces of the filter frame 6 to contact filtrate hole seats of adjacent filer plates. An amount of projection of the flanked portions of the filtrate line seal 74 is identical with that of the stock line seal 48.

Figure 3:
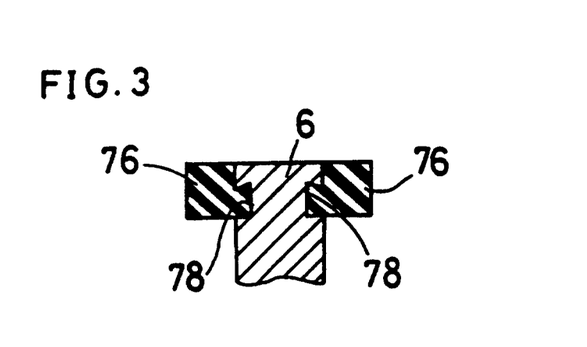
FIG. 3 is an enlarged sectional view of a part of the filter plate shown in FIG. 2.

As shown in FIG. 2, a pair of washer liquid seals 76 are mounted on the opposite side surfaces of each filter frame 6 along the outer periphery thereof. Each washer liquid seal 76 is formed as a substantially square loop member corresponding to an outline form of the filter frame 6, and it is made of an elastic material such as rubber. As shown in FIG. 3, a pair of loop dovetail groove 78 are formed on the opposite side surfaces of the filter frame 6 along the outer periphery thereof, and the washer liquid seals 76 are fitted with the dovetail grooves 78 in a dovetail joint fashion, respectively, so that the washer liquid seals 76 are prevented from escaping from the dovetail grooves 78. The washer liquid seals 76 equally project from the opposite side surfaces of the filter frame 6, and an amount of projection of each washer liquid seal 76 is set to be larger by a predetermined amount than that of the stock line seal 48 and the filtrate line seal 74. As apparent from FIGS. 4 and 5, in the form of the array of the filter plates 4 and the filter frames 6, all of the stock line 66, the filtrate line 68, the washer liquid supply line 70 and the washer liquid discharge line 71 are disposed inside the washer liquid seals 76. Further, the stock line seals 48 and the filtrate line seals 74 are disposed inside the washer liquid seals 76.

As shown in FIG. 4, the front end of the array of the filter plates 4 and the filter frames 6 is formed as a filter plate 4F also serving as a front end plate, and the rear end of the array is formed as a filter plate 4R also serving as a rear end plate. The filter plates 4F and 4R are different from the other filter plates 4 in the point that the filter bed 24 and the filter element 28 are provided on one side surface of each filter plate. Accordingly, the filter plates 4F and 4R are recessed to define central spaces 26F and 26R, respectively. Further, stock line seals 48F and 48R of the filter plates 4F and 4R are so formed as to project from only one side surface of each filter plate. The stock line seal 48F of the filter plate 4F serves to close the front end of the stock line 66. A filtrate line hole 38F of the filter plate 4F is formed as a recess rather than a through hole.

In the following description, the filter plates 4F and 4R will be handled as the same as the other filter plates 4 for the simplicity of illustration. Such similar handling will also be applied to the associated parts of the filter plates 4F and 4R (i.e., the stock line seals 48F and 48R, the central spaces 26F and 26R, and the filtrate line hole 38F).

Now, the operation of the beer filtering device 2 as constructed above will be described.

In a filtering step, the hydraulic cylinder 20 shown in FIG. 1 is operated to push the rear end of the array of the filter plates 4 and the filter frames 6 through the pressure plate 18, so that each spacing between the filter plate 4 and the filter frame 6 adjacent to each other is reduced to set a filtering position. In this condition, the washer liquid seals 76 of each filter frame 6 are elastically deformed to tightly contact the side surfaces or washer liquid seats of the adjacent filter plates 4 along the outer peripheries thereof. Similarly, the stock line seal 48 of each filter plate 4 is elastically deformed to tightly contact the side surfaces of the adjacent filter frames 6 around the stock line holes 56 thereof, and the filtrate line seal 74 of each filter frame 6 is also elastically deformed to tightly contact the side surfaces of the adjacent filter plates 4 around the filtrate line holes 38 thereof. In this way, the stock line 66 and the filtrate line 68 are liquid-tightly defined. Further, the filter elements 28 are pressed between the annular projections 52 of the adjacent filter frames 6 and the filter plate 4 interposed therebetween around the filter beds 24, thereby defining the filter chamber 54.

Then, a beer stock obtained by a ripening step is supplied under pressure from a stock supply pipe 80 into the stock line 66. The beer stock in the stock line 66 is fed in parallel through the stock introduction passages 72 of the filter frames 6 into the filter chambers 54. The beer stock in the filter chambers 54 is passed through the filter elements 28 to filter off the yeast, bacteria, protein, etc. The filtrate of the beer stock thus obtained is fed in parallel from the central spaces 26 of the filter plates 4 through the filtrate discharge passages 44 to the filtrate line 68. The filtrate is then collected to a filtrate collecting pipe 82, and is subjected to a subsequent packaging step. Further, there is a possibility that a minute amount of the beer stock in the filter chamber 54 leaks through the pressure-contact portion of the filter element 28 between the filter plate 4 and the filter frame 6. However, the leaked beer stock is prevented from leaking out of the filtering device by the washer liquid seals 76, and the leaked beer stock is washed away in the subsequent washing step.

In the filtering step, an amount of elastic compressive deformation of each washer liquid seal 76 is larger than that of each stock line-seal 48 and each filtrate line seal 74.

In a washing step to be performed after the filtering step, a relief pressure of the hydraulic cylinder 20 is reduced, so that the pressure of the pressure plate 18 applied to the rear end of the array of the filter plates 4 and the filter frames 6 is reduced to thereby allow increasing of each spacing between the filter plate 4 and the filter frame 6 adjacent to each other. Accordingly, the filter plates 4 and the filter frames 6 disposed in the filtering position are moved away from each other by an elastic return force of each washer liquid seal 76 plus an elastic return force of each stock line seal 48 and each filtrate line seal 74. Even after the stock line seals 48 and the filtrate line seals 74 are returned to their original form, the spacings between the filter plates 4 and the filter frames 6 are further expanded by the elastic return force of the washer liquid seals 76, so that the stock line seals 48 are separated from the side surfaces of the filter frames 6, and the filtrate line seals 74 are separated from the side surfaces of the filter plates 4 as shown in FIG. 6. Further, the pressure applied to the filter element 28 between the filter plate 4 and the filter frame 6 is released as shown in FIG. 6. Thereafter, when the elastic return force of the washer liquid seals 76 is balanced to the applied pressure of the hydraulic cylinder 20, the spacings between the filter plates 4 and the filter frames 6 are stabilized. At this time, the washer liquid seals 76 are still in the elastically deformed condition under compression, thereby maintaining the sealed condition of the interior off the filtering device which corresponds to a washing position of the filter plates 4 and the filter frames 6. In other words, the relief pressure of the hydraulic cylinder 20 is set in the washing step so that the above sealed condition may be maintained in the washing step.

In case of performing the washing step prior to the filtering step, the filter plates 4 and the filter frames 6 maintained in a free condition (with no pressure from the hydraulic cylinder 20) are pushed by the hydraulic cylinder 20 under the aforementioned preset pressure for the washing step, and are brought into the washing position shown in FIGS. 5 and 6.

In any case, under the condition shown in FIGS. 5 and 6, a washer liquid is supplied under pressure from a washer liquid supply pipe 84 to the washer liquid supply line 70, and is circulated over the interior region sealed by the washer liquid seals 76. That is, the washer liquid fed from the washer liquid supply line 70 is allowed to flow in parallel through the spaces among the filter plates 4, the filter elements 28 and the filter frames 6, and is discharged through the washer liquid discharge line 71 to a washer liquid recovery pipe 86. By the washing step, all of the periphery of each stock line seal 48, the periphery of the openings of the stock line hole 56 of each filter frame 6, the filter beds 24, the filter elements 28, the periphery of each filtrate line seal 74, and the periphery of the openings of the filtrate line hole 38 of each filter plate 4 are entirely washed and sterilized by the washer liquid. Since the outer peripheries of the filter plates 4 and the filter frames 6 are sealed by the washer liquid seals 76 in the washing step, the washer liquid is prevented from leaking outside the filtering device 2, and the washable region in the filtering device 2 can be expanded to the maximum.

In modification, the washer liquid may be supplied from the washer liquid discharge line 71 and be recovered from the washer liquid supply line 70. Further, under the condition shown in FIG. 6, the washer liquid may be supplied from the stock line 66 and be recovered from the filtrate line 68, or the washer liquid may be supplied from the filtrate line 68 and be recovered from the stock line 66. In this case, the washer liquid supply line 70 and the washer liquid discharge line 71 shown in FIG. 5 may be omitted.

In case of replacing the filter elements 28, the hydraulic cylinder 20 is retracted to its rearmost position, and the filter plates 4 and the filter frames 6 are manually moved away from each other to expand the spacings therebetween, thus easily effecting the replacement of the filter elements 28. This is due to the fact that the filter plates 4 and the filter frames 6 are not connected to each other by any connecting members, but they are merely movably supported to the guide rails 12 through the guide rollers 16.

Although the two washer liquid seals 76 are mounted on the opposite side surfaces of each filter frame 6 in this preferred embodiment, they may be mounted on the opposite side surfaces of each filter plate 4 rather than each filter frame 6, or a single washer liquid seal may be mounted on one side surface of each filter plate 4 and another washer liquid seal may be mounted on one side surface of each filter frame 6 on the same side as of the filter plate 4. Further, the washer liquid seals 76 may be formed as bellows, so as to contemplate easy and large elastic deformation in the thickness direction of the filter plates 4 and the filter frames 6.

Although the central space 26 is defined between the opposed filter beds 24 of each filter plate 4 in this preferred embodiment, the filter beds 24 may be replaced by a single filter bed having a plurality of slits to eliminate the central space 26.

In further modification, the upper holes 36 and 40 of each filter plate 4 and the upper holes 56 and 60 of each filter frame 6 may be employed as stock line holes, and the lower holes 38 and 42 of each filter plate 4 and the lower holes 58 and 62 of each filter frame 6 may be employed as filtrate line holes. Additionally as required, a washer liquid supply line and a washer liquid discharge line may be formed so as to extend across the array of the filter plates 4 and the filter frames 6. In this case, an additional stock line seal for liquid-tightly connecting the holes 40 and 60 and an additional filtrate line seal for liquid-tightly connecting the holes 42 and 62 are provided. Further, an additional stock introduction passage for communicating the hole 60 to the filter chamber 54 and an additional filtrate discharge passage for communicating the central space 26 to the hole 42 are provided.

Further, although each of the stock line seal 48 and the filtrate line seal 74 is formed as a cylindrical member with opposite flanged portions in this preferred embodiment, they may be formed as ring-shaped members mounted at the opposite opening portions of each stock line hole 56 and each filtrate line hole 58.

Further, sensor means such as a limit switch or a proximity switch may be provided to detect operational positions of the piston rod 22 and the pressure plate 18 of the hydraulic cylinder 20 corresponding to the filtering position and the washing position of the filter plates 4 and the filter frames 6. According to a detection signal from the sensor means, the operation of the hydraulic cylinder 20 may be selected between the filtering step and the washing step.

In further modification, referring to FIG. 4, a passage 90 (shown by a phantom line) is formed in each filter frame 6 so as to introduce a washer liquid from the outside into an annular space S defined between each filter frame 6 and the adjacent filter plate 4 around the outer periphery of the filter element 28. Further, another passage 92 (shown by a phantom line) is formed in each filter frame 6 at the position radially opposite to the passage 90 so as to recover the washer liquid with the beer stock leaked out of the filter chamber 54 from the annular space S to the outside. Accordingly, even when the beer stock is leaked from the filter chamber 54 through the outer peripheral portion of the filter element 28 to the annular space S, the leaked beer stock can be washed away even during the filtering step.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A beer filtering device of a filter press type for filtering a beer stock as an intermediate product in producing beer, said beer filtering device comprising:

a plurality of parallel filter plates displaceably arranged at intervals, each of said filter plates supporting a filter element for filtering beer stock, each of said filter plates having a filtrate discharge passage for discharging a filtrate of said beer stock filtered by said filter element to an outer peripheral portion of said filter plate;

said each filter plate having a pair of first guide portions projecting from an outer peripheral surface of said each filter plate in opposite directions parallel to a plane of said each filter plate;

a pair of first guide rollers supported rotatably around horizontal pivot axes supported by said pair of first guide portions of said each filter plate, respectively;

a plurality of filter frames oriented parallel to said filter plates and being displaceably arranged at intervals in alternate relationship to said filter plates so that one of said filter plates is disposed between a pair of said filter frames;

each of said filter frames having an opening extending therethrough to define a filter chamber between said filter elements of said filter plates adjacent said filter chambers, each of said filter frames having a stock introduction passage for introducing said beer stock from an outer peripheral portion of said filter frame to said filter chamber;

said each filter frame having a pair of second guide portions projecting from an outer peripheral surface of said each filter frame in opposite directions parallel to a plane of each filter frame;

first and second passages formed in said filter frames extending from an annular space formed between said filter frames and an adjacent filter plate around a periphery of said filter element and extending to respective points outside of said filter press, whereby a washing liquid may be introduced into said annular passage via said first passage and withdrawn from said annular space via said second passage to wash away any beer stock leaking from the periphery of the filter element into said annular space;

a pair of second guide rollers supported rotatably around horizontal pivot axes supported by said pair of second guide portions of said each filter frame;

a pair of parallel guide rails for guiding said first and second guide rollers, said guide rails horizontally extending in a direction perpendicular to said plane of said each filter plate and said plane of said each filter frame;

a stock line for supplying said beer stock to said stock introduction passages of said filter frames in parallel, said stock line being formed by a plurality of stock line holes extending coaxially through said outer peripheral portions in a direction perpendicular of said filter plates and said filter frames so as to be communicated with each other;

a filtrate line for collecting filtrate from said filtrate discharge passages of said filter plates in parallel, said filtrate line being formed by a plurality of filtrate line holes extending coaxially through said outer peripheral portions in a direction perpendicular of said filter plates and said filter frames independently of said stock line holes so as to be communicated with each other;

a plurality of tubular stock lines seals each having an elasticity and attached to and surrounding a respective stock line hole at said outer peripheral portion of each of one of said filter plate and said filter frame, each said stock line seal including a free end for liquid-tightly engaging a stock line hole seat portion of said outer peripheral portion surrounding an adjacent stock line hole for sealing a communicating portion between the adjacent ones of said stock line holes during a filtering step, each of the free ends of said stock line seals being separated from their respective seat portions during a washing step;

a plurality of tubular filtrate line seals each having an elasticity and attached to and surrounding a respective filtrate line hole at said outer peripheral portion of each of one of said filter plate and said filter frame independently of each said stock line seal, each said filtrate line seal including a free end for liquid-tightly engaging a filtrate line hole seat portion of said outer peripheral portion surrounding an adjacent filtrate line hole for sealing a communicating portion between the adjacent ones of said filtrate line holes in said filtering step, each of the free ends of said filtrate line seals being separated from their respective seat portions in said washing step; and a plurality of washer liquid seals each having an elasticity and attached to an outermost peripheral portion of one of each of said filter plate and said filter frame to surround said stock line seals and said filtrate line seals and said filter chamber, each washer liquid seal including a free end for liquid-tightly engaging a washer liquid seat portion of said outer peripheral portion of an adjacent one of said filter plates and said filter frames for sealing said narrow spacing between the adjacent ones of said filter plates and filter frames in said filtering step and for liquid-tightly sealing said expanded spacing between the adjacent ones of said filter plates and said filter frames in said washing step;

wherein said stock line seals, said filtrate line seals, and said washer liquid seals are configured so that the free ends of said stock line seals and said filtrate lines seals are spaced from their respective seats while the free ends of said washer liquid line seals sealingly contact their respective seats;

a pressure plate disposed adjacent to an end one of said filter plates so as to abut against said end one;

a hydraulic cylinder for setting a filtering position of said filter plates and said filter frames where a spacing between the adjacent filter plates and filter frames is narrow during said filtering step and for setting a washing position of said filter plates and said filter frames where said spacing is expanded during said washing step;

whereby in said washing step, a sealing condition of said washer liquid seals is maintained, and a sealing condition of said stock line seals and said filtrate lines seals is released, so that a washer liquid is introduced into a sealed space defined in said beer filtering device inside said washer liquid seals.

2. The beer filtering device as defined in claim 1, wherein each of said washer liquid has a shape corresponding to an outline form of said each filter frame, and a pair of said washer liquid seals are mounted on opposite side surfaces of an outermost peripheral portion of said each filter frame.

3. The beer filtering device as defined in claim 1 further comprising:

a washer liquid supply line for supplying said washer liquid to said sealed space, said washer liquid supply line being formed by a plurality of supply line holes penetrating through said filter plates and said filter frames along the thickness direction of said filter plates and said filter frames in the region surrounded by said washer liquid seals; and a washer liquid discharge line for discharging said washer liquid from said sealed space, said washer liquid discharge line being formed by a plurality of discharge line holes which are formed independently of said washer liquid supply holes and penetrate through said filter plates and said filter frames along the thickness direction thereof in the region surrounded by said washer liquid seals.

* * * * *